Patented Apr. 11, 1950

2,503,964

UNITED STATES PATENT OFFICE 2,503,964

PREPARATION OF AN IRON-ALKALI METAL FERRATE CATALYST

Max A. Mosesman, Baytown, Tex., assignor, by mesne assignments, to Standard Oil Development Company, Elizabeth, N. J., a corporation of Delaware No Drawing. Application December 20, 1946, Serial No. 717,583

4 Claims. (Cl. 252—474)

1

This invention is directed to a method for preparing a composition adapted to be used as a catalyst. More particularly, this invention relates to a method for preparing a promoted catalyst for utilization in the hydrogenation of carbon oxides.

It is well known to the art to synthesize hydrocarbons and oxygenated derivatives of hydrocarbons by passing a mixture of carbon monoxide and hydrogen over a suitable catalyst at elevated temperatures and pressures. This reaction is commonly designated as the Fischer-Tropsch synthesis and is usually carried out at temperatures in the range of about 450° to 675° F. and pressures in the range of 100 to 500 pounds per square inch. Such reactions have customarily been carried out in the presence of catalysts comprising the oxides of metals in group VIII of the periodic table such as the oxides of iron, cobalt, and nickel. It is also known to use such oxides as catalyst either alone or supported on an inert material such as alumina, kieselguhr, and other such supporting agents. It has also been known to add to the active catalytic material in the catalyst composition a substance usually designated as a promoter which exerts a specific effect on the catalyst activity, selectivity of the reactants to useful products, and on the active life of the catalyst. Catalysts containing promoters in substantially small quantities often permit consistently high conversion of the reactants to desired products over much longer periods of operation than is possible when using an unpromoted catalyst.

It is the object of the present invention to provide a method for preparing an improved catalyst. A pertinent object of the present invention is to devise a method for preparing a catalyst particularly adapted for use in the Fischer-Tropsch synthesis. Another object of this invention is to prepare a catalyst that may be utilized in the synthesis of high yields of useful products by the hydrogenation of carbon oxides during long periods of operation.

The present invention may be described briefly as involving the preparation of a catalyst comprising a major portion of iron or an iron oxide as the active catalyst material and a minor portion of alkali metal ferrate as the promoting material. Specific examples of the alkali metal ferrates include potassium ferrate ($K_2FeO_4$), sodium ferrate and lithium ferrate. The method of preparation comprises the steps of forming a mixture of iron filings and an alkali metal nitrate, such as potassium nitrate, igniting the mixture and after ignition washing the mixture with alcohol, drying and adding selected amounts of the reaction product to iron or iron oxide and ball milling the mixture in the presence of alcohol. After milling, the mixture is dried, pilled, and heated in a free-oxygen containing atmosphere at an elevated temperature. Prior to employing the oxidized material as a catalyst it should be subjected to a reducing atmosphere at an elevated temperature.

The present invention will be further illustrated by one method of preparing an iron oxide catalyst comprising an alkali metal ferrate promoter. The method of preparation employed for a typical catalyst which comprised one hundred parts ferro-ferric oxide to five parts by weight of the alkali metal ferrate included the following:

A previously dried intimate mixture of one part by weight of fine iron filings or iron powder and two parts by weight of potassium nitrate is placed on an iron plate such that the mixture is distributed as a continuous layer of about two centimeters in depth. To this layer is joined a small quantity of approximately equal parts by weight of fine iron filings or iron powder and potassium nitrate. The latter mixture is then ignited and the reaction proceeds to the mixture of one part of iron powder and two parts of potassium nitrate is allowed to continue until completion of the reaction in both mixtures to form a reaction product. The formation of a dense, white cloud of volatile potassium requires suitable precautions for removal of the harmful fumes. The reaction product is a black melted hydroscopic mixture which is allowed to cool. On cooling sufficiently for handling it is transferred to a vessel containing absolute ethyl alcohol. The reaction mixture is washed with alcohol by decantation until it is substantially free of alkali, following which it is dried by evaporation in a vacuum. The dried material is then added to a given weight of iron oxide. The iron oxide employed may be ferro-ferric oxide or it may be alpha or gamma iron oxide.

The amount of the reaction mixture added to the iron oxide may vary within rather wide limits, but it is contemplated that the amount of alkali metal ferrate will constitute between 0.2 and 20% by weight of the mixture. The mixture of iron oxide and the reaction product has added to it sufficient alcohol to permit adequate milling. It is then mixed thoroughly for about four hours by ball milling and then dried at approximately 110° C. and pilled. Finally, the pilled mixture is heated in a free oxygen containing atmosphere, such as air at a temperature of approximately 1000° F., for four and one half hours and then cooled to obtain the finished catalyst.

The presence of small amounts of iron filings or iron powder and/or potassium nitrates in the finished catalyst is not objectionable, since heating in the presence of a free oxygen containing atmosphere will oxidize the former to iron oxide and the latter will be decomposed to potassium oxide.

The catalyst prepared in accordance with the above process may then be utilized in the synthesis of hydrocarbons and organic oxygenated compounds by placing it in a reaction chamber and reducing it in the presence of hydrogen for twenty-four hours at a temperature of 700° F. and at atmospheric pressure. The amount of hydrogen employed corresponds to a feed rate of hydrogen of 1000 volumes per volume of catalyst per hour.

In employing the reduced catalyst in the synthesis of hydrocarbons and oxygenated compounds a synthesis gas mixture comprising one part of hydrogen per part of carbon monoxide is passed over the catalyst at a pressure of 150 p. s. i. g., temperature of 575° F. and a rate of 200 volumes per volume of catalyst per hour. In operating with the catalyst prepared in accordance with the present invention under the above mentioned conditions, good yield of hydrocarbon and oxygenated compounds may be obtained over substantial periods of operating time.

As another method of preparing the catalyst in accordance with the present invention, a previously dried intimate mixture of one part by weight of fine iron powder and two parts by weight of potassium nitrate was placed on an iron plate and distributed as a layer of approximately 2 centimeters depth. A second layer of approximately equal parts by weight of iron powder and potassium nitrate was then placed adjacent to the first layer. The second layer was then ignited and the reaction proceeds to the mixture of one part iron powder and two parts of potassium nitrate allowed to go to completion of the reaction in both mixtures to form a reaction product. A dense white cloud of volatile potassium formed which was removed from the reaction zone. The reaction product was cooled sufficiently for handling and removed from the iron plate and heated in a free oxygen containing atmosphere at approximately 1000° F. for about 4 hours. After the foregoing operation, the reaction product was ground into a fine powder and pilled into one-eighth inch pills. Subsequent to the pilling operation, the pills were placed in a reaction chamber and reduced in the presence of hydrogen for 24 hours at a temperature of 700° F. and at atmospheric pressure. The hydrogen was passed over the catalyst at a feed rate of hydrogen of 1000 volumes per volume of catalyst per hour.

The catalyst prepared as described in the foregoing paragraph was then employed to synthesize hydrocarbons from an equal mixture of hydrogen and carbon monoxide. The feed mixture of hydrogen and carbon monoxide was passed over the catalyst at a pressure of 150 p. s. i. g., a temperature of 575° F. and at a feed rate of 200 volumes per volume of catalyst. The catalyst prepared in accordance with this method of the present invention gives good yields of hydrocarbon and oxygenated compounds which may be obtained over substantial periods of operating time.

While examples of temperature and pressure conditions suitable for use in the practice of the present invention have been given to illustrate its advantages, it will be obvious to a worker skilled in the art that temperatures and pressures over a substantial range may be employed and good results obtained. It will also be obvious that the promoting material admixed with the iron or iron oxide catalyst may be present over a substantial range and satisfactory results obtained. It is not intended that the above-cited examples limit the scope of my invention.

Having fully described and illustrated the practice of the present invention, what I wish to claim as new and useful and to secure by Letters Patent is:

1. A method for preparing a catalyst adapted for use in a Fischer-Tropsch synthesis which consists of the steps of forming a mixture of approximately two parts of finely divided iron and approximately three parts of alkali metal nitrate, igniting the mixture, adding the ignited mixture to iron oxide in an amount in the range between 0.2 and 20% by weight of the iron oxide mixture subjecting the mixture of iron oxide and ignited mixture to a free oxygen containing atmosphere at an elevated temperature of the order of 1000° F. for about four hours and subsequently contacting the oxidized mixture with a reducing atmosphere at an elevated temperature of about 700° F. for approximately 24 hours.

2. A method in accordance with claim 1 in which the alkali metal nitrate is potassium nitrate.

3. A method for preparing a catalyst adapted for use in a Fischer-Tropsch synthesis which consists of the steps of forming a first mixture of one part of finely divided iron and two parts of alkali metal nitrate, forming a second mixture of equal parts of finely divided iron and metal nitrate adjacent the first mixture, igniting the second mixture, allowing the reaction to proceed to the first mixture, completing the reaction of the first and second mixture to obtain a reaction product, adding the reaction product to iron oxide to form a third mixture, subjecting the third mixture to a free oxygen-containing atmosphere at an elevated temperature of about 1000° F. for about four hours and subsequently contacting the third mixture with a reducing atmosphere at an elevated temperature of about 700° F. for approximately 24 hours.

4. A method in accordance with claim 3 in which the alkali metal nitrate is potassium nitrate.

MAX A. MOSESMAN.

No references cited.